US012791136B2

(12) United States Patent
Luccia

(10) Patent No.: US 12,791,136 B2
(45) Date of Patent: Nov. 10, 2026

(54) APPARATUS FOR SEALING PIPES AND PLUMBING FITTINGS AND FIXTURES

(71) Applicant: Paul Luccia, Houston, TX (US)

(72) Inventor: Paul Luccia, Houston, TX (US)

( * ) Notice: Subject to any disclaimer, the term of this patent is extended or adjusted under 35 U.S.C. 154(b) by 0 days.

(21) Appl. No.: 18/461,631

(22) Filed: Sep. 6, 2023

(65) Prior Publication Data

US 2023/0408016 A1 Dec. 21, 2023

Related U.S. Application Data

(63) Continuation of application No. 17/367,908, filed on Jul. 6, 2021, now Pat. No. 11,781,695.

(51) Int. Cl.

| | |
|---|---|
| ***F16L 41/08*** | (2006.01) |
| ***F16L 5/02*** | (2006.01) |
| ***F16L 5/10*** | (2006.01) |
| *E04B 1/62* | (2006.01) |

(Continued)

(52) U.S. Cl.

CPC ............... *F16L 41/082* (2013.01); *F16L 5/02* (2013.01); *F16L 5/025* (2013.01); *F16L 5/10* (2013.01); *E04B 1/62* (2013.01); *E04B 1/625* (2013.01); *E04B 1/68* (2013.01); *E04B 1/6803* (2013.01); *F16L 5/00* (2013.01)

(58) Field of Classification Search

CPC . F16L 41/082; F16L 5/02; F16L 5/025; F16L 5/10; F16L 5/00; E04B 1/62; E04B 1/625; E04B 1/68; E04B 1/6803

See application file for complete search history.

(56) References Cited

U.S. PATENT DOCUMENTS

| | | |
|---|---|---|
| 3,363,912 A | 1/1968 | Holloway |
| 3,788,655 A | 1/1974 | Hathaway |
| 4,200,299 A | 4/1980 | Carlesimo |

(Continued)

FOREIGN PATENT DOCUMENTS

| | | |
|---|---|---|
| DE | 4131637 C2 | 5/2001 |
| EP | 3358235 A1 | 8/2018 |

(Continued)

OTHER PUBLICATIONS

Notification of Transmittal of the International Search Report and the Written Opinion issued on Aug. 3, 2022 in corresponding International Application No. PCT/US2022/028275; 8 pages.

(Continued)

*Primary Examiner* — Craig M Schneider
*Assistant Examiner* — Christopher D Ballman
(74) *Attorney, Agent, or Firm* — Maier & Maier, PLLC

(57) ABSTRACT

An apparatus for sealing a hole or a shape in a surface may be disclosed. According to an exemplary embodiment, a soft material may be provided containing an interior hole, an exterior surface, a top lip, and an outer area. In an exemplary embodiment, a bottom lip may be further incorporated. In another exemplary embodiment, a rough surface may be imprinted onto the pipe seal apparatus. The rough surface may be imprinted into the interior portion of the body and the exterior portion of the body and the top lip, or both. An adhesive pipe sealant may be used along the rough surface. The rough surface may have a higher overall surface area for the adhesive to bond to, creating a stronger bond and preventing delamination.

20 Claims, 7 Drawing Sheets

(51) Int. Cl.
*E04B 1/68* (2006.01)
*F16L 5/00* (2006.01)

(56) References Cited

U.S. PATENT DOCUMENTS

| | | | | |
|---|---|---|---|---|
| 4,342,462 | A | 8/1982 | Carlesimo | |
| 4,387,900 | A | 6/1983 | Ditcher et al. | |
| 4,640,478 | A | 2/1987 | Leigh-Monstevens | |
| 4,809,994 | A | 3/1989 | Skinner et al. | |
| 5,248,154 | A | 9/1993 | Westhoff et al. | |
| 5,275,199 | A | 1/1994 | Howell | |
| 5,501,472 | A | 3/1996 | Brancher et al. | |
| 5,529,312 | A | 6/1996 | Skinner et al. | |
| 5,615,526 | A * | 4/1997 | Palmer | E04D 13/0431 52/302.1 |
| 5,711,536 | A | 1/1998 | Meyers | |
| 5,741,015 | A | 4/1998 | Skinner | |
| 5,977,486 | A | 11/1999 | Fujita | |
| 6,860,070 | B2 | 3/2005 | Gilleran | |
| 7,028,972 | B2 | 4/2006 | Miller et al. | |
| 8,079,599 | B2 | 12/2011 | Meyers | |
| 8,486,525 | B2 * | 7/2013 | Segur | C09J 7/38 277/647 |
| 10,018,287 | B2 | 7/2018 | Coscarella | |
| 10,822,815 | B1 | 11/2020 | Vance | |
| 2003/0019163 | A1 | 1/2003 | Dittel | |
| 2006/0027388 | A1 * | 2/2006 | Collins | H02G 3/22 174/663 |
| 2011/0024993 | A1 | 2/2011 | Happel et al. | |
| 2013/0056937 | A1 | 3/2013 | Watermann | |
| 2013/0234404 | A1 | 9/2013 | Coscarella | |
| 2019/0017257 | A1 | 1/2019 | Coscarella | |
| 2019/0277581 | A1 | 9/2019 | Chang et al. | |
| 2021/0113970 | A1 | 4/2021 | Stainer et al. | |

FOREIGN PATENT DOCUMENTS

| | | | |
|---|---|---|---|
| JP | 06348320 | B2 | 6/2018 |
| WO | 2015108557 | A1 | 7/2015 |

OTHER PUBLICATIONS

Supplementary European Search Report issued on Apr. 22, 2025, in corresponding European Application No. 22838192.7, 16 pages.

* cited by examiner

APPARATUS FOR SEALING PIPES AND PLUMBING FITTINGS AND FIXTURES

CROSS-REFERENCE TO RELATED APPLICATIONS

This application is a continuation of U.S. application Ser. No. 17/367,908, filed on Jul. 6, 2021, and the entire contents of each of which are incorporated herein by reference.

FIELD OF INVENTION

An apparatus for sealing pipes and vessels which may be installed around a pipe or plumbing fitting is disclosed.

BACKGROUND

When a pipe or flow control device is intended to pass through or be inserted into a tank or a vessel wall, it is necessary to secure the connection between the pipe and the tank in a manner that permits the free flow of liquids between the pipe and the tank. A common method of securing such a connection is a bulkhead fitting, also known as a tank fitting. Such fittings are usually formed from two parts, with the main structure of the bulkhead fitting being a threaded main body with a hollow core. The body of the bulkhead fitting can be inserted into the opening on one side of the wall of the tank, and a locknut can be provided on the main body on the other side of the wall of the tank, thus securing the bulkhead fitting in place. Fluid can then be provided through the hollow core of the bulkhead fitting, allowing a fluidic connection between the pipe and the tank via the bulkhead fitting.

Pipe and valve seals may also be used in place of bulkhead fittings. Unlike a bulkhead fitting, a pipe seal does not require a locknut to thread into the surface to be sealed. Instead, pipe seals may be inserted into or onto the surface, where a pipe is inserted into or through the pipe seal. A conventional pipe seal is formed from a soft and flexible material, such as silicone, latex, polyurethane, or rubber to ensure that the material conforms to the shape of the pipe or plumbing fixture, forming a seal.

Since the pipe seal is intended to fit snugly or tightly against the pipe, the snug fit and precise fitment of a pipe seal is instrumental to its function. It can be difficult to adhere a flexible pipe seal to a substrate or pipe in the absence of a surface which allows the pipe seal to be adhered to a substrate, or which allows the material of the surface to be finished with typically available, industry approved adhesives. The variety of pipes and plumbing fittings of various sizes and shapes would mean an end user would require a wide variety of pipe seals on hand. Thus, there exists a need in the field for a pipe seal that can cater to these various applications.

SUMMARY

In an exemplary embodiment, an apparatus for sealing a hole, opening, or a shape in a surface may be disclosed. According to an exemplary embodiment, such an apparatus may have a structure formed from a soft, flexible material with an interior opening provided opposite an exterior surface with roughened areas for attachment of adhesives. In an exemplary embodiment, such a structure may further have a bottom lip. In another exemplary embodiment, a rough surface may be imprinted onto one or all sides of the pipe seal apparatus. The rough surface may be imprinted into the interior portion of the body and the front and back sides. An adhesive sealant may be used along the rough surface at the pipe penetration. The roughness of the surface may provide a higher overall surface area for an adhesive to bond to, creating a stronger bond and preventing delamination. The roughened areas may be of a size and configuration as to allow the expansion and contraction of the seal, thus giving it the ability to fit snugly around the pipe or plumbing apparatus.

An exemplary embodiment may be customizable by the end user, which may allow it to be custom fitted to a specific need. Such customization ensures that a watertight seal is formed regardless of the application. A pipe seal which is customizable may have printing, impressions, or raised areas indicating standard pipe sizes and plumbing fitting shapes which allow for the pipe seal to be stretched over the pipe or fitting to form a tight seal, while leaving the rest of the seal to be attached to the adjoining surface.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
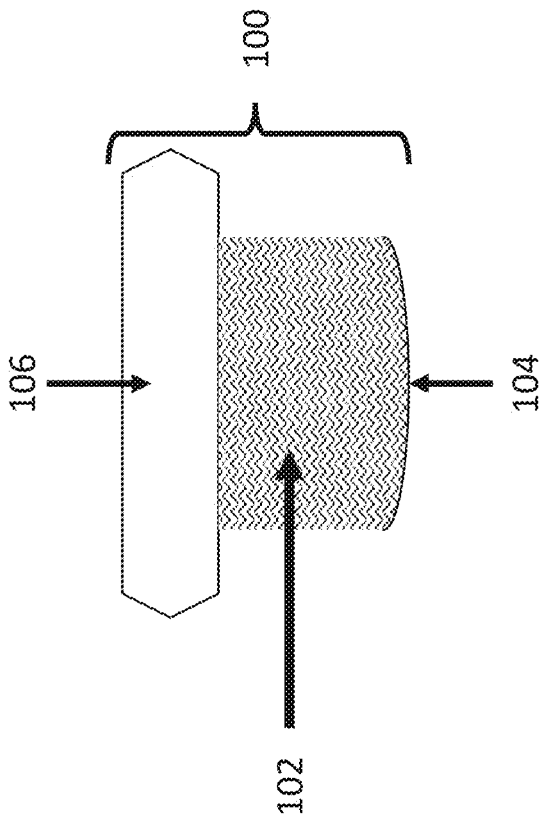
FIG. 1 is an exemplary side view of a pipe seal.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word “exemplary” means “serving as an example, instance or illustration.” The embodiments described herein are not limiting, but rather are exemplary only. It should be understood that the described embodiments are not necessarily to be construed as preferred or advantageous over other embodiments. Moreover, the terms “embodiments of the invention”, “embodiments” or “invention” do not require that all embodiments of the invention include the discussed feature, advantage or mode of operation.

A pipe seal may be shown and described. The pipe seal may contain a body, a front end and a rear end. In an exemplary embodiment, a pipe seal may be used to seal pipes which penetrate waterproofing for bathroom and wet area applications. It may be contemplated that the pipe or plumbing fixture may contain an aperture of any size or shape. The front end of the pipe seal may be configured to receive a pipe or any other vessel at a retention site, which may, for example, be a hollow opening. For example, the pipe, vessel, or fitting may be inserted into the front end of the pipe seal, which may elastically deform around the inserted pipe, vessel, or fitting in a manner which creates a seal, which may operate to block the egress of fluid (or other material) from the pipe, and may likewise block the ingress of environmental contamination. Further, the seal may also block any leakage of whatever material or substance is contained in the surface the pipe seal is inserted into. For example, a pipe seal which connects a pipe to a barrel may prevent the substance in the barrel from leaking out around the circumference of the pipe. For example, a pipe seal may be used in a tile assembly in a shower where the pipe seal prevents water from the shower from penetrating the tile assembly at the location of the pipe or plumbing fixture.

In an exemplary embodiment, the seal may be altered by the user to accommodate a square, round, odd shaped, or multiple plumbing fixtures where no seal has been provided by the plumbing fixture manufacturer or the standard seals are of the incorrect size or shape. In such an instance the user can create an orifice in order to create the desired waterproof seal.

The rear end of the pipe seal may be shaped or fitted to be inserted into a hole or aperture in a surface. The surface may be the surface which a pipe will be inserted into. The surface may be another pipe. The rear end of the pipe seal may also be formed from a soft material so as to create a seal and conform to the shape of the apparatus and the surface. The rear end may be formed in a variety of shapes and sizes, depending on the application. The rear end may be a different shape or size than the front end. The rear end may be a different material than the front end. The rear end may utilize threads, bolts, or an adhesive to further ensure it is properly affixed to the surface. In an alternate exemplary embodiment, the rear end may be threaded into a hole or aperture in a surface which may also have threads.

The back side of the pipe seal may be plain with the inclusion of the raised areas for adhesion or printed, raised, or indented markings different from the front side to allow for increased indications of standard sizes or metric conversions. Typical pipe seals are of limited and fixed sizes and shapes. An exemplary embodiment may be customizable by the end user to accommodate the widest variety of plumbing fixtures and pipes. In instances where the pipe or plumbing fixture has an uneven surface (such as a cap on the end of a pipe) an exemplary seal can be stretched over a larger area in order to create the seal around the smaller section of the pipe or plumbing fixture. Common to bathroom valves, there are screws which attach the escutcheon to the plumbing valve, sandwiching the wall assembly between the escutcheon and the valve body. An exemplary valve seal may allow these screws to penetrate the valve seal with minimal effect on the seal.

The pipe seal may further incorporate a rough surface on the body, front, or rear end. The rough surface may allow a sealant to more thoroughly bond with the pipe seal. The rough surface may be imprinted on to the soft material before or after the pipe seal is formed. In an exemplary embodiment, the rough surface may be formed on the substrate material of the pipe seal; for example, one side of the pipe seal may be mechanically roughened via abrasion, grit blasting, which may increase the surface area available for adhesion and remove weakly bound surface layers. In another exemplary embodiment, a coarse material may be applied to the side of the pipe seal via adhesive in order to provide a rough surface which may be bonded more easily to the material of the pipe via different adhesives than would be appropriate for bonding the substrate material directly to the pipe. A corresponding rough surface may also be deployed onto the pipe as well as onto the surface receiving the pipe and pipe seal. The sealant may more thoroughly stick to a rough surface as opposed to a smooth or flat surface because a rough surface with many peaks, valleys, and deviations, may have a higher surface area for the sealant so bond with. Further, a rough surface may create more friction, further securing the pipe and pipe seal in place. The rough surface may be on both the front and back sides to allow for adhesion with standard industry adhesives without delamination. The pattern of the rough surface may allow the seal to be stretched around a plumbing fitting as needed.

A body portion of the pipe seal may connect the front end and the rear end. The body can range in size and shape depending on the application. The body may create an angle between the front end and the rear end or may be straight. The body, front end, and rear end may be formed from a single connected material. In a further embodiment, the body may be reinforced to ensure it can endure the same pressures as the pipe or the surface.

In another exemplary embodiment, the pipe seal may be a flat piece of a soft and flexible material, such as silicone, latex, polyurethane, or rubber. A soft material may be one that can conform to the shape of an imperfect underlying surface. The flat material may include a raised, heat applied, or pressure applied layer of absorbent polyester fleece or another absorbent fibrous polymer structure. An aperture may be formed in the center of the pipe seal material, such as the sheet of silicone, in order to receive a pipe fitting or other vessel. One side of the sheet may contain a rough surface. In an exemplary embodiment, a side of the sheet may include a layer of fleece. Various material thicknesses may likewise be contemplated, and may depend on the material employed; for example, in one exemplary embodiment, the pipe seal may be a flat sheet of silicone, latex, polyurethane, or rubber.

Typical pipe seals used for waterproofing in shower, baths, and other wet areas are of fixed sizes and shapes, have a very limited number of variants, and are made in such a manner as to prevent the end user from modifying the seal as site conditions require. That means if the standard pipe seal does not fit the plumbing fixture, there is no seal. An exemplary embodiment is highly modifiable by the end user to meet countless site conditions.

In an exemplary embodiment, the seal may be a flat sheet with edges that can be shaped in such a manner as to facilitate manufacturing processes as well as be of size and shape to accommodate the desired results of the end user.

Referring now to exemplary FIG. 1, a side view of a pipe seal may be shown. The pipe seal 100 may include a top lip 106, a body 102, and a bottom hole 104, which may be formed from a single piece of material. The body 102 may be impressed with a rough surface on the inside and outside. An adhesive pipe sealant may be applied to the body 102. The rough surface of body 102 may bond to the adhesive with more strength than a straight surface. Further, the rough surface on the body 102 may create additional friction, further securing the pipe within as well as further securing the pipe seal within the surface. The top lip 106 may ensure that the pipe seal does not enter into the surface below. The top lip 106 may be larger than the hole in which the pipe seal 100 is inserted into. The body 102 may be as large as the hole in which the pipe seal 100 is inserted into. In another exemplary embodiment, there may be another lip opposite the top lip 106, which may securely hold the other side of the pipe seal. The bottom hole 104 may be configured in a size that may securely grip the pipe or vessel being sealed. The surface may have printing, impressions, or raised markings as shown in the attached diagram.

Figure 2:
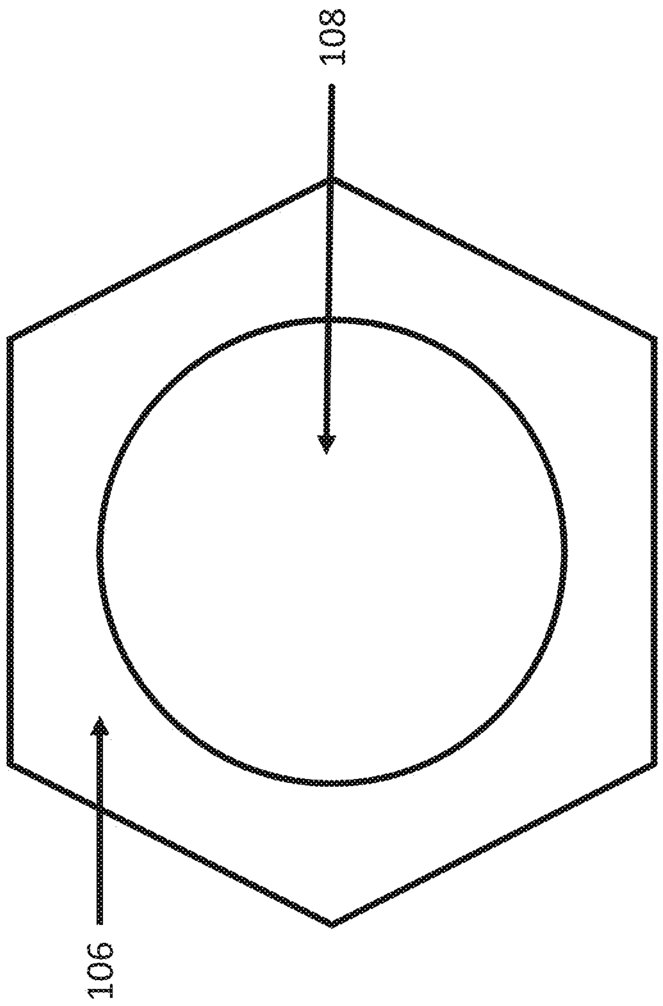
FIG. 2 is an exemplary top view of a pipe seal.

Referring now to exemplary FIG. 2, a top view of a pipe seal is shown. The top view may illustrate the top lip 106 as it surrounds the hole 108. The hole 108 may be connected to the bottom hole 104 by the body 102, which may be disposed therebetween. The top lip 106 may be disposed in such a way that it is larger than the hole 108 and larger than the hole which the pipe sealing apparatus is inserted into. The top lip 106 may ensure that the entire pipe sealing apparatus cannot slip into the surface. The top lip 106 may also be imprinted with a rough surface so as to increase friction with the surface. The rough surface also may create a larger surface area which a pipe sealant or adhesive may strongly bond to. Furthermore, the top lip 106 may be formed in a hexagonal shape to ease in the manufacturing process. The seal may be a circle, hexagon, square, or any contemplated shape. The shape may be determined by the manufacturer for the client and the manufacturing process.

Figure 3:
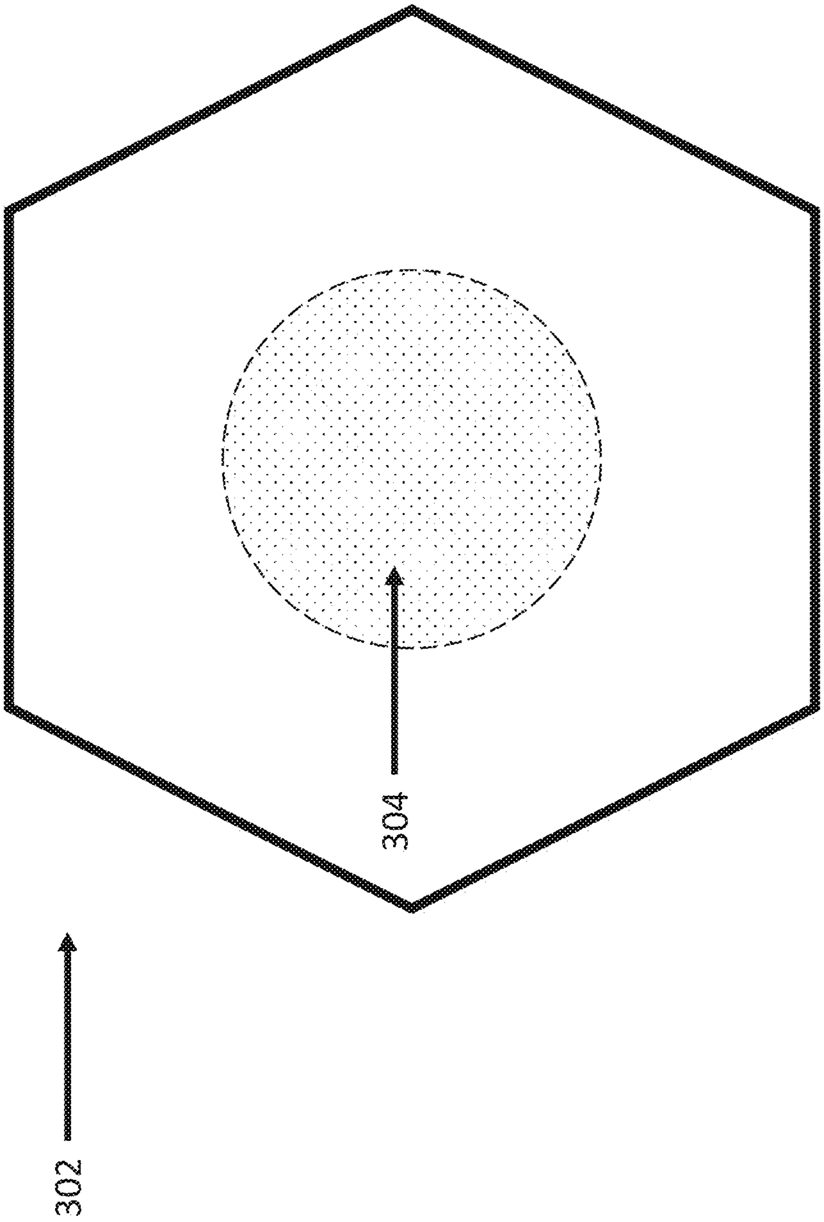
FIG. 3 is an exemplary embodiment of a sealing apparatus.

Referring now to FIG. 3, FIG. 3 may illustrate an exemplary embodiment of a sealing apparatus. In this exemplary embodiment, the sealing apparatus may be a flat sheet 302. The flat sheet may be any shape. For illustrative purposes, the flat sheet 302 in this exemplary case is hexagonal. However, a rectangular sheet may be contemplated, for example. The flat sheet may be entirely made of a soft material, such as rubber, silicone, latex, polyurethane, or any other contemplated soft material.

The sheet may have a front and a rear side. The sheet may have an opening in the center. In the exemplary embodiment illustrated in FIG. 3, the sheet may have a perforated or weakened area 304 in the center, allowing a user to easily create an opening to allow a pipe or vessel to go through. The center perforated area may be a retention site. In yet another embodiment, the sheet may be fully closed, and a user may manually create an opening. Alternatively, the sheet may be wrapped around a pipe, as opposed to the pipe going through the sheet.

Figure 4A:
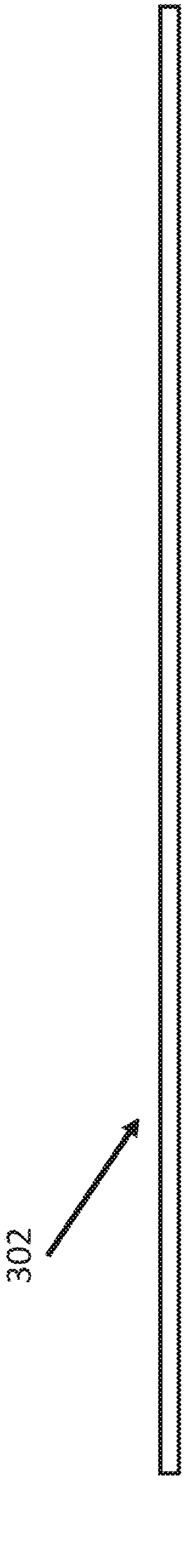
FIG. 4A illustrates a side view of an exemplary embodiment of a pipe seal.
Figure 4B:
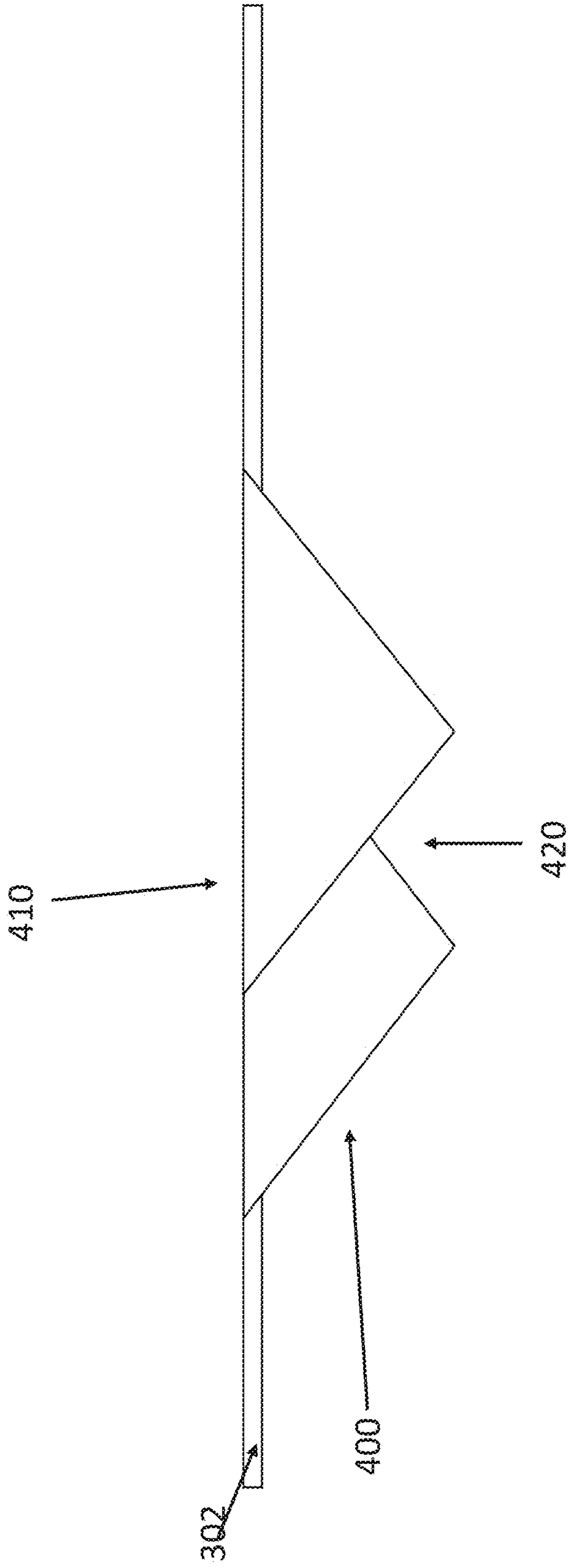
FIG. 4B illustrates a side view of an exemplary embodiment of a pipe seal which contains an opening at the center.

Referring now to FIG. 4A, FIG. 4A may illustrate a side view of an exemplary embodiment. As illustrated by FIG. 4, the sheet 302 may be flat. FIG. 4B may illustrate a side view of an exemplary embodiment which contains an opening at the center. The opening 304 may be configured such that the material discarded from the opening aperture area is pushed downward through the front side 410, creating sidewalls 400 which may adhere to the pipe or vessel inserted into the opening and/or may adhere to the receiving surface on the rear side 420 of the seal.

Figure 4C:
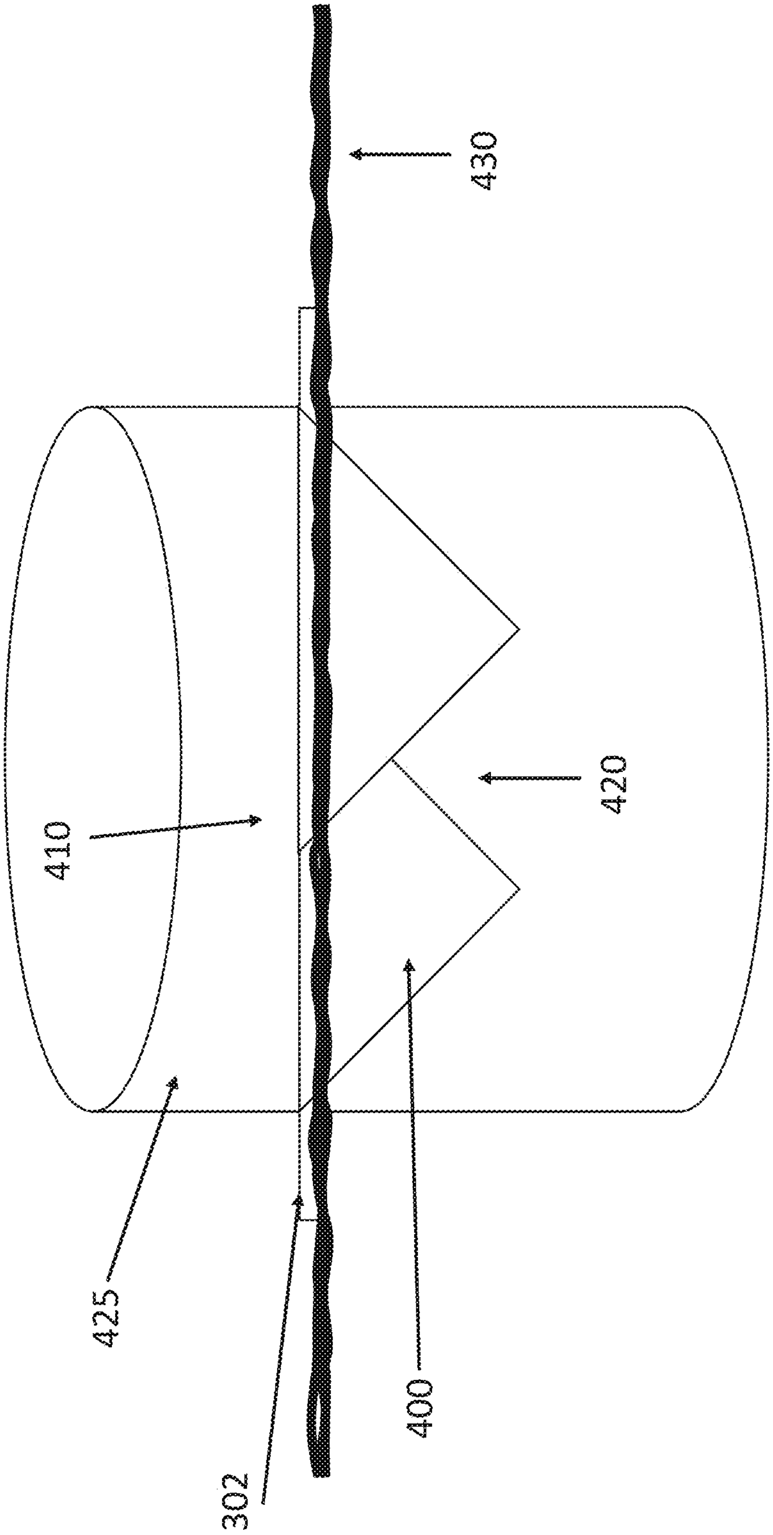
FIG. 4C illustrates a side view of an exemplary embodiment of a pipe seal as fitted around a pipe.

Referring now to FIG. 4C, FIG. 4C may illustrate an exemplary side view of an embodiment. A pipe 425 may be inserted through the flat sheet 302. In the exemplary embodiment depicted in FIG. 4C, the flat sheet 302 is placed on a rough receiving surface 430. The rubber or soft properties of the seal allow it to conform to the shape of the underlying surface 430. Thus, a watertight seal may be constructed even on uneven surfaces.

Figure 5:
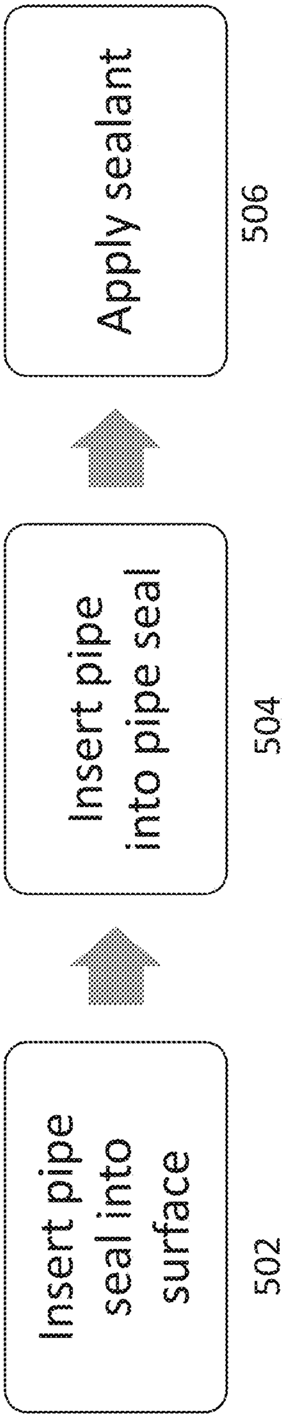
FIG. 5 is a flowchart depicting an exemplary embodiment of a method for sealing pipes.

Referring now to FIG. 5, FIG. 5 may illustrate an exemplary schematic flowchart of a method for sealing pipes. First, an exemplary pipe seal may be applied to a receiving surface 502. Then the pipe or other vessel may be inserted into the pipe seal which is on the surface 504. Finally, in an optional final step, sealant may be applied to the pipe seal 506.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A sealing apparatus, comprising:

a flat sheet comprising a first surface, a second surface, and a center portion; wherein:

the first surface of the flat sheet is covered with an absorbent fibrous polymer layer and the second of the flat sheet is covered in a rough surface configured to adhere to a receiving surface, the center portion is configured to provide an opening upon insertion of a pipe or vessel therethrough, material surrounding the opening is configured to elastically deform around the inserted pipe or vessel and configured to create sidewalls out of material discarded from the opening, and the sidewalls adhere to an exterior surface of the pipe or vessel, the first surface comes into sealing contact with the exterior surface of the pipe or vessel, the second surface adheres to the receiving surface, and an area of the opening on the first surface is equal to an area of the opening on the second surface opposite the first surface.

2. The sealing apparatus of claim 1, wherein the flat sheet is a soft material.

3. The sealing apparatus of claim 2, wherein the soft material is selected from the set of: silicone, latex, polyurethane, and rubber.

4. The sealing apparatus of claim 1, wherein the flat sheet is wrapped around the pipe.

5. The sealing apparatus of claim 1, wherein the rough surface comprises a roughened area of a material of the flat sheet directly formed on the material of the flat sheet.

6. The sealing apparatus of claim 1, wherein the rear side is covered in a coarse material adhered to a material of the flat sheet.

7. The sealing apparatus of claim 1, wherein the front side is covered in a coarse material adhered to the absorbent fibrous polymer layer.

8. The sealing apparatus of claim 1, wherein the absorbent fibrous polymer layer is polyester fleece.

9. The sealing apparatus of claim 1, further comprising:

a sealant, wherein the sealant is applied to the both the first surface and the second surface.

10. The sealing apparatus of claim 1, wherein the sheet is rectangular.

11. A method for sealing pipes, comprising:

applying a sealing apparatus to a receiving surface, said sealing apparatus having a first surface covered with an absorbent fibrous polymer layer and a second surface having a rough surface;

inserting the pipe or vessel through the center of the sheet, thereby causing the center of the sheet to provide an opening upon insertion of a pipe or vessel therethrough, such that material surrounding the opening is configured to elastically deform around the inserted pipe or vessel and configured to create sidewalls out of material discarded from the opening, and the sidewalls adhere to an exterior surface of the pipe or vessel;

applying sealant to the sealing apparatus;

adhering the first surface of the sealing apparatus to the pipe or vessel; and adhering the second surface of the sealing apparatus to the receiving surface via the sealant; wherein an area of the opening on the first surface is equal to an area of the opening on the second surface opposite the first surface.

12. The method for sealing pipes of claim 11, wherein the sealing apparatus comprises a flat sheet formed from a soft material.

13. The method for sealing pipes of claim 12, wherein the soft material is selected from the set of: silicone, latex, polyurethane, and rubber.

14. The method for sealing pipes of claim 11, wherein the flat sheet is wrapped around the pipe.

15. The method for sealing pipes of claim 11, wherein the second surface comprises a roughened area of a material directly formed on the material of the second surface.

16. The method for sealing pipes of claim 11, wherein the second surface is covered in a coarse material adhered to a material of the second surface.

17. The method for sealing pipes of claim 11, wherein the first surface is covered in a coarse material adhered to the absorbent fibrous polymer layer.

18. The method for sealing pipes of claim 11, wherein the absorbent fibrous polymer layer is polyester fleece.

19. The method for sealing pipes of claim 11, wherein the sealing apparatus is rectangular.

20. A pipe system, comprising:

a pipe inserted into a center portion of a sealing apparatus, wherein the sealing apparatus comprises:

a flat sheet comprising a first surface, a second surface, and the center portion, wherein the first surface of the flat sheet is covered with at least an absorbent fibrous polymer layer and the front surface, the second surface of the flat sheet is covered in a rough surface configured to adhere to a receiving surface, the center portion is configured to provide an opening upon insertion of the pipe therethrough, material surrounding the opening is configured to elastically deform around the inserted pipe or vessel and configured to create sidewalls out of material discarded from the opening, and the sidewalls adhere to an exterior surface of the pipe, the first surface comes into sealing contact with the exterior surface of the pipe extending through the center portion of the flat sheet, and the second surface adheres to the receiving surface; wherein an area of the opening on the first surface is equal to an area of the opening on the second surface opposite the first surface.

* * * * *